(12) United States Patent
Olmr

(10) Patent No.: US 11,009,207 B2
(45) Date of Patent: May 18, 2021

(54) ILLUMINATED WINDSHIELD ASSEMBLY USING AN EXTERNAL LIGHT SOURCE AND OPTICAL WAVEGUIDE

(71) Applicant: Robert P Olmr, Graton, WI (US)

(72) Inventor: Robert P Olmr, Graton, WI (US)

(*) Notice: Subject to any disclaimer, the term of this patent is extended or adjusted under 35 U.S.C. 154(b) by 0 days.

(21) Appl. No.: 16/944,513

(22) Filed: Jul. 31, 2020

(65) Prior Publication Data

US 2021/0033253 A1 Feb. 4, 2021

Related U.S. Application Data

(60) Provisional application No. 62/881,693, filed on Aug. 1, 2019.

(51) Int. Cl.
| | |
|---|---|
| *F21S 41/24* | (2018.01) |
| *B60J 1/02* | (2006.01) |
| *B60R 16/033* | (2006.01) |
| *B60Q 1/00* | (2006.01) |
| *F21V 8/00* | (2006.01) |
| *B60Q 1/28* | (2006.01) |
| *F21W 104/00* | (2018.01) |

(52) U.S. Cl.
CPC ............ *F21S 41/24* (2018.01); *B60J 1/02* (2013.01); *B60Q 1/0011* (2013.01); *B60Q 1/28* (2013.01); *B60R 16/033* (2013.01); *G02B 6/0005* (2013.01); *F21W 2104/00* (2018.01)

(58) Field of Classification Search
CPC ......... F21S 41/24; B60Q 1/0011; B60Q 1/28; B60Q 1/268; B60R 16/033; G02B 6/005
See application file for complete search history.

(56) References Cited

U.S. PATENT DOCUMENTS

| | | | |
|---|---|---|---|
| 5,590,947 A | 1/1997 | Kidd, Jr. | |
| 6,453,841 B1 | 9/2002 | Shearer et al. | |
| 7,275,845 B2 | 10/2007 | Miller | |
| 8,840,288 B2 | 9/2014 | Plavetich et al. | |
| 9,534,764 B2 | 1/2017 | Trajlinek et al. | |
| 2018/0345631 A1* | 12/2018 | Klein | B32B 17/067 |

* cited by examiner

*Primary Examiner* — Thomas M Sember
(74) *Attorney, Agent, or Firm* — Theorem Law, LLC; John M. Osmanski

(57) ABSTRACT

An improved illuminatable windshield assembly comprising of an external light source and an optical waveguide, preferably for use on a vehicle such as a golf cart, but adaptable for use on all types of vehicles. The illuminatable windshield assembly includes a windshield comprised of a translucent panel having an outer surface, inner surface and peripheral surface wherein the panel has a channel formed therein defining an edge in the windshield, an optical waveguide seated within the channel and disposed to emit light into the edge for illuminating at least a portion of the windshield, a light source connected to said optical waveguide with the light source being external to, and situated remotely from, the windshield, and a source of electrical power for the light source. Preferably, the source of electrical power is the vehicle's existing electrical system. The windshield may additionally have an ornamental design etched therein.

14 Claims, 7 Drawing Sheets

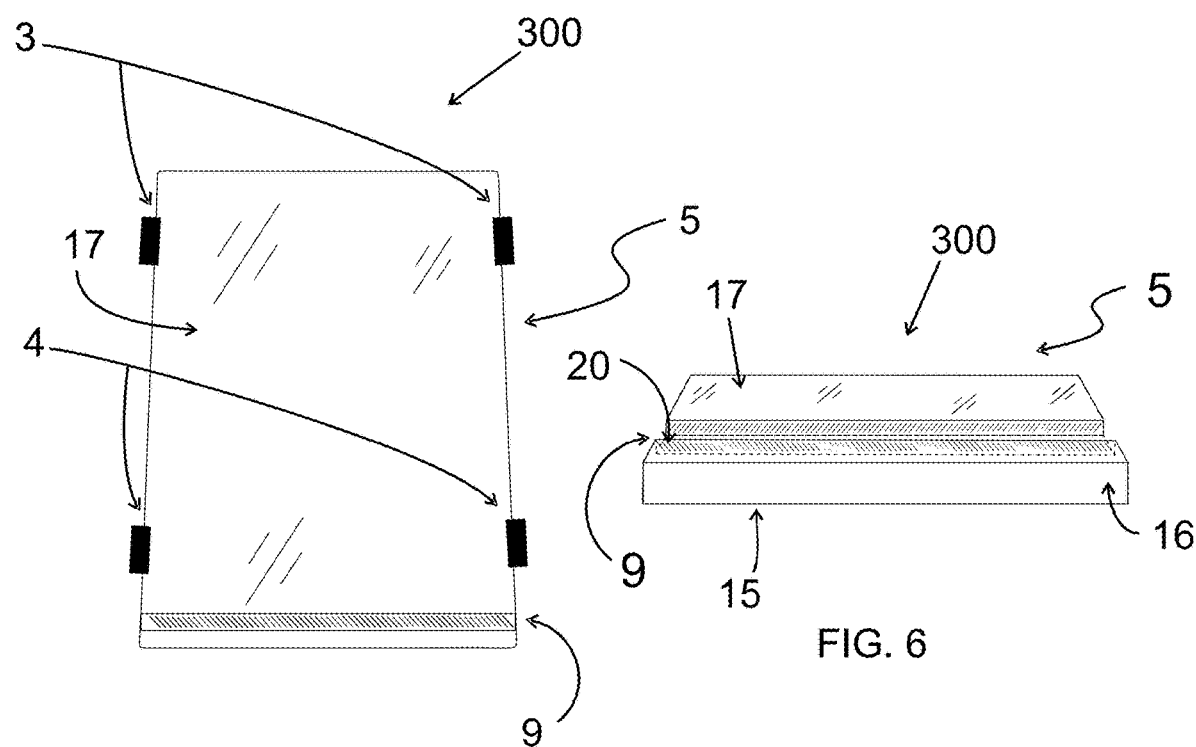

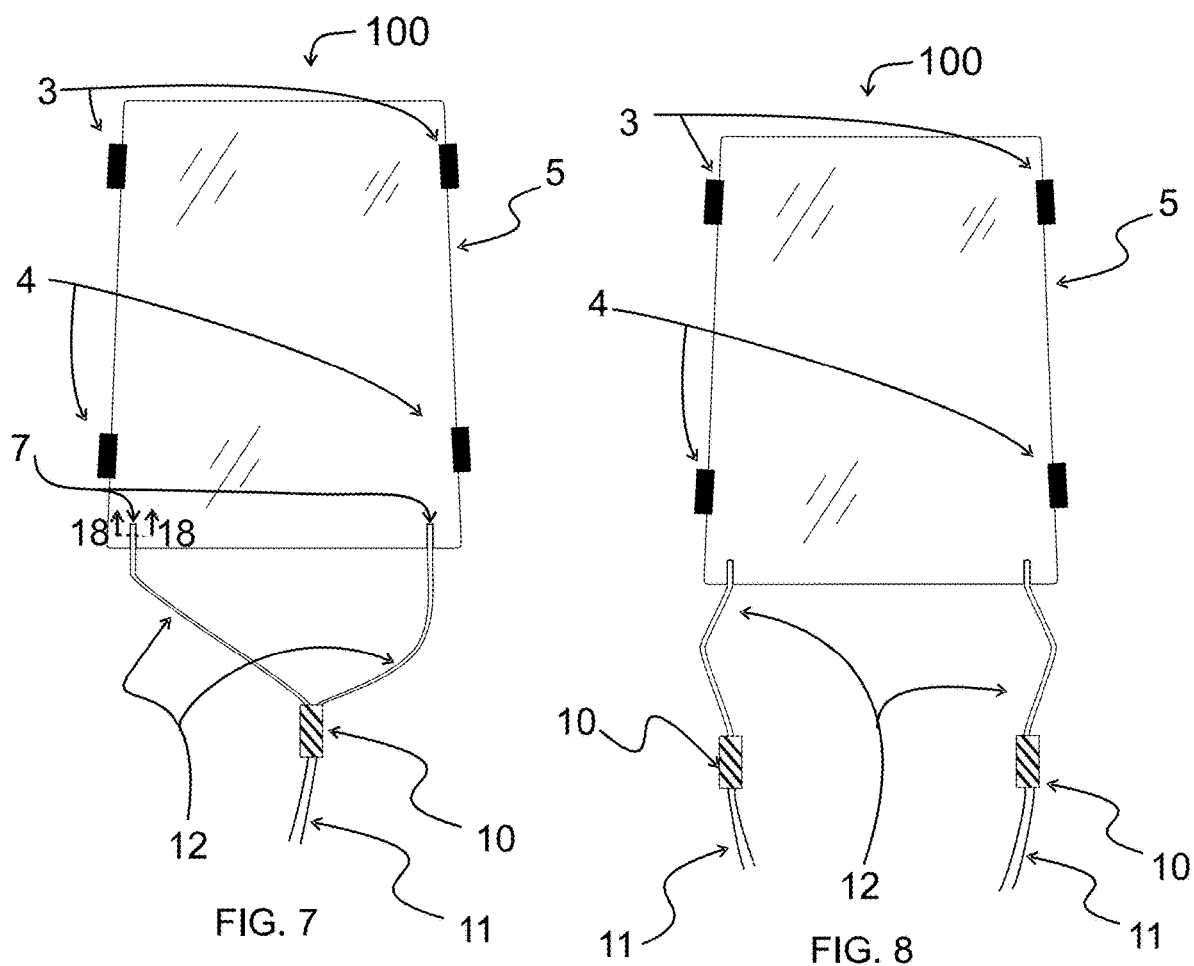

ILLUMINATED WINDSHIELD ASSEMBLY USING AN EXTERNAL LIGHT SOURCE AND OPTICAL WAVEGUIDE

CROSS REFERENCE TO RELATED APPLICATIONS

U.S. Provisional application No. 62/881,693, filed on Aug. 1, 2019.

BACKGROUND OF THE INVENTION

The present invention relates to windshields, and more particularly to an improved illuminatable windshield assembly, especially adaptable for use on a golf cart and other vehicles such as motorcycles, watercraft, ATVs, and snowmobiles.

Golf cart owners are known for accessorizing and customizing their golf carts. Recent trends in customization include the use of LEDs (or other similar light sources) to visually enhance the appearance of the golf cart. The lighting is used either as accent lighting or can be used to illuminate the vehicle's windshield.

Specifically, with the increasing popularity of using lights to illuminate a vehicle's windshield, there have been a number of inventions whereby light is transmitted directly from a light source to the windshield. However, the existing inventions are limited by high manufacturing costs, difficulty of production, difficulties in weather sealing, overall durability, or inability to meet legal requirements for street-legal use. For example, U.S. Pat. No. 7,275,845B2 utilizes a complicated arrangement of light-emitting diode arrays inserted directly into the windshield; U.S. Pat. No. 8,840,288B2 utilizes an external light source specially aligned so as to shine into the peripheral edge of a window panel; U.S. Pat. No. 5,590,947A consists of a combination of lights, clips and slots formed in the windshield; and, U.S. Pat. No. 6,453,841B1 and U.S. Pat. No. 9,534,764B2 each contemplate using trim to affix a light source directly to the edge of a windshield.

It is therefore desirable to provide a new and unique component for golf carts which will enable owners to customize their vehicles in a more durable, easy-to-manufacture and cost-effective manner.

SUMMARY OF THE INVENTION

The present invention relates to windshields, and more particularly to an improved illuminatable windshield assembly, especially adaptable for use on golf carts and other vehicles such as motorcycles, watercraft or snowmobiles. This invention contemplates the use of a light source situated remotely from the windshield and that illuminates at least a portion of a windshield via an optical waveguide.

In an exemplary embodiment, the illuminatable windshield assembly is comprised of a translucent windshield having a channel formed in the outer peripheral surface, an optical waveguide having one terminal end seated within said channel and the opposite terminal end coupled to a light source. The light source is powered by the vehicle's electrical system.

In the exemplary embodiment, the light source (for example, an "RGB 2W side glow fiber optic LED light source illuminator" readily available through commercial retailers) is encased in a weatherproof housing and the optical waveguide is a fiber optic cable (either end-glow or side-emitting fiber optic cable) having a diameter less than the thickness of the windshield.

Additionally, the fiber optic cable is of sufficient length so that the light source can be affixed in an appropriate location upon the vehicle but remotely to the windshield.

The fiber optic cable should be of sufficient diameter to transmit sufficient light into to the windshield from the light source but less than the thickness of the windshield. As most golf cart windshields are 3/16" or 1/4" thick, a three (3) millimeter diameter fiber optic cable is sufficient.

The dimensions of the channel in the outer peripheral surface of the windshield may be adjusted to accommodate any number of fiber optic cables; however; it is preferred that the channel should be of the minimum width and depth necessary to securely, but completely, embed a singular fiber optic cable within the windshield when the fiber optic cable is seated in said channel. The shape of the channel will be determined by the manner in which it is cut into the windshield (i.e., whether it is drilled or routered, the type of bit used), but should, ideally, match the profile of the optical waveguide chosen.

It is contemplated that one or more light sources may be coupled to one or more optical waveguides with each waveguide being seated in the windshield as described supra.

The optical waveguides may terminate within the windshield. Similarly, the channel for the optical waveguide may be configured to allow both ends of the optical waveguide to simultaneously extend from the windshield so that each of the ends can be coupled to a light source concurrently.

It is also contemplated that a different light sources may be used to provide different visual effects. For example, monochromatic light sources may be used to reduce cost. RGB light sources may be used to produce different color light without the need for multiple monochromatic light sources. Similarly, two or more different light sources may be utilized concurrently to blend colors, whether RGB or monochromatic.

BRIEF DESCRIPTION OF THE DRAWINGS

The various advantages of the embodiments will become apparent to one skilled in the art by reading the following specification and appended claims, and by referencing the following drawings, in which:

FIG. 5 is an alternate embodiment of illuminatable windshield assembly (300) where channel (9) is cut into the driver's side rear surface (17) of the windshield (5) so that both ends of the optical waveguide can extend from the windshield.

FIG. 6 is a top perspective view of alternative embodiment of illuminatable windshield assembly (300).

FIG. 7 is a top view of an embodiment of illuminatable windshield assembly (100) depicting a singular light source (10).

FIG. 8 is a front view of an embodiment of illuminatable windshield assembly (100) depicting multiple light sources (10).

DETAILED DESCRIPTION OF THE DRAWINGS

Figure 9:
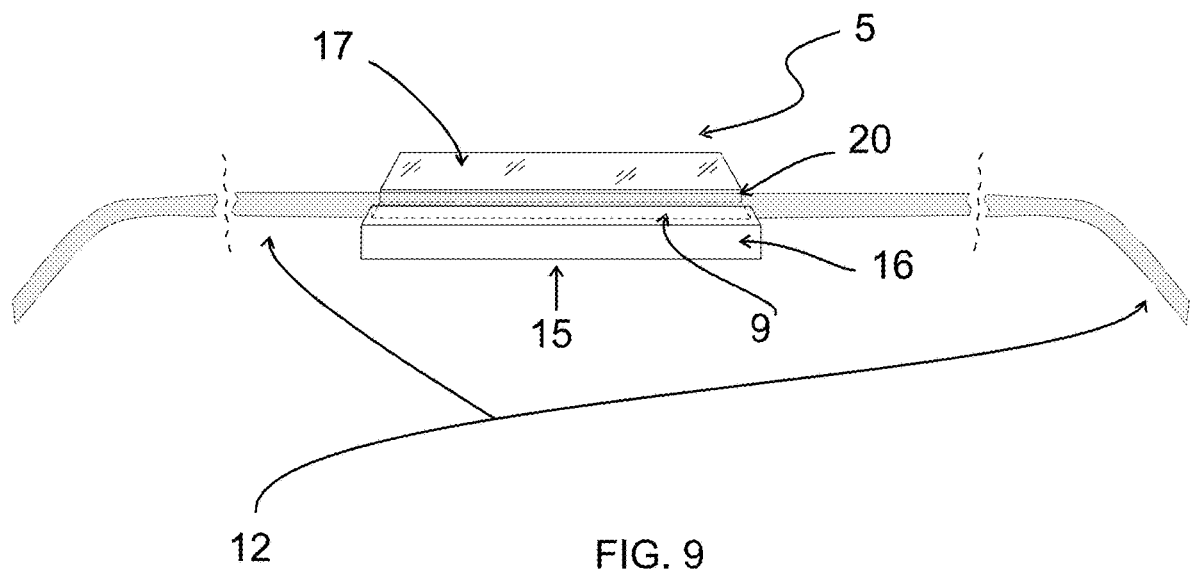
FIG. 9 is a top perspective view illuminatable windshield assembly (300) depicting both ends of the optical light guide extending from the windshield.
Figure 10:
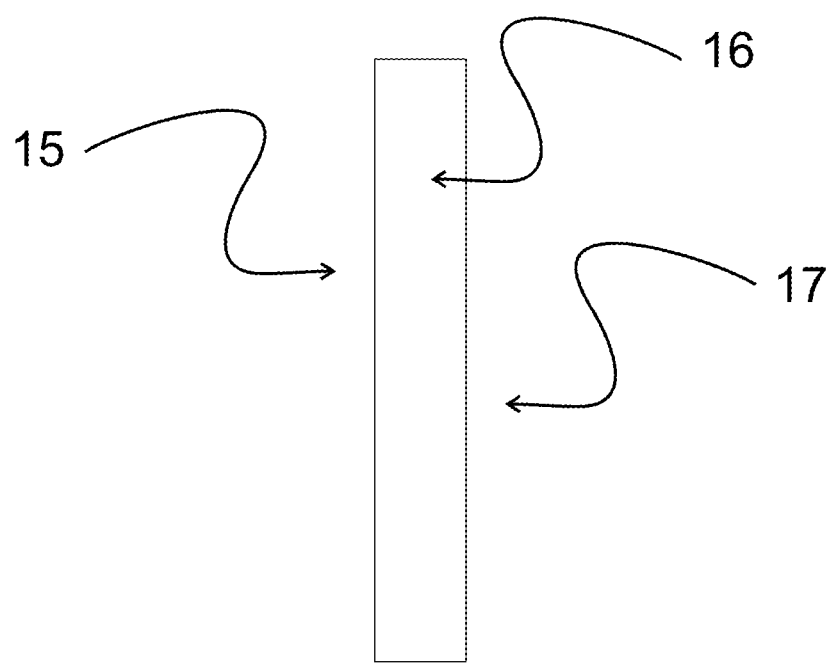
FIG. 10 is a side view of a typical golf cart windshield.

An illuminatable windshield assembly will now be described with references in FIGS. 1-11. Turning to the drawings, where the reference characters indicate corresponding elements throughout the several figures, attention is first directed to FIG. 1 where a perspective view of a an embodiment of illuminatable windshield assembly is shown, illustrating its composition and the apparatus is generally indicated by reference character (100) illustrates a golf cart generally (1) with a body (6), support columns (14) for a roof (2) and windshield (5), upper retaining clips (3) and lower retaining clips (4) for securing the windshield assembly (100) to the support columns (6), and an ornamental design (13) formed in the rear surface (17) of the windshield assembly (100). The clips (3) and (4) depict the typical manner in which golf cart windshields are attached to the front support columns. Clips (3) and (4) can vary in location, size, or number depending on the golf cart model. The ornamental design (13) can be of any design and of any size or in any location so as not to interfere with the safe operation of the vehicle. Windshield (5) further comprises a front surface (15), a rear surface (17) and a frameless peripheral surface (16) defining a thickness. Ornamental designs (13) can be of any of any suitable type such that the ornamental design (13) interferes with the internal reflectivity of the windshield (5) thereby causing light to emit from said design and appear to illuminate. Such ornamental designs (13) are well known in the art and usually achieved by laser engraving, mechanical engraving, or by applying ornamental self-adhesive decals. Ornamental designs (13) are generally employed on the driver's side rear surface (17) to avoid damage and debris. Regardless of whether an ornamental design (13) is employed, the present invention will cause the peripheral surface (16) to illuminate and if an ornamental design (13) exists on windshield (5) it will also be illuminated. Although the exact dimension and type of material out of which a golf cart windshield is made may vary according to the specific model, most golf cart windshields share the same general characteristics. For instance, most golf cart windshields are made of either ³⁄₁₆" or ¼" thick acrylic, plexiglass, some combination thereof, or other like material. Golf cart windshields measure approximately 39 inches wide by 36 inches tall, and are approximately rectangular in shape, although some golf cart windshield models may have a slight recess formed along the bottom edge to follow the profile of the golf cart hood. While most golf cart windshields are relatively flat, some may have a slight outward convex bow. It is very common for windshields for the same golf cart model to be offered in both "non folding" and "folding" configurations. Non folding windshields are constructed from a single piece of material; whereas folding windshields are constructed from two distinct pieces of material, roughly equal in dimension, affixed to each other via a hinge so that the top half of the windshield can be folded down and over the bottom half of the windshield. The improved illuminatable windshield assembly works equally well on all models of golf cart windshields; the locations and orientations of the channels of the improved illuminatable windshield assembly can be adjusted depending on the model golf cart windshield to which it is being employed; however, it has been found that installation in both the bottom corners of any golf cart windshield produces uniform light distribution to illuminate the edges of the windshield as well as any ornamental design employed on the windshield. FIG. 10 is a side view (not to scale) of a typical golf cart windshield depicting front surface (15), peripheral surface (16), and driver's side rear surface (17).

Figure 1:
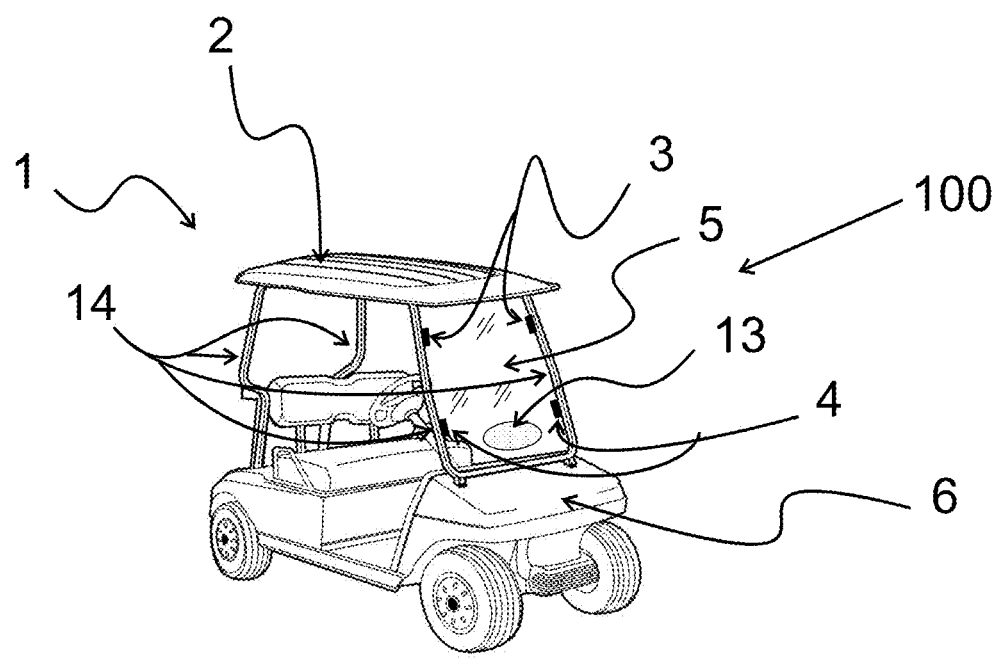
FIG. 1 is a perspective view of a golf cart (1) as one exemplary application of the illuminated windshield assembly (100) according to the described embodiments.
Figure 2:
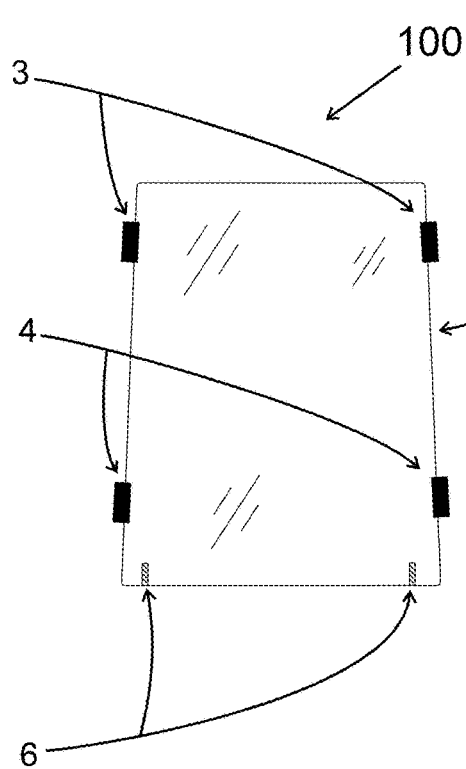
FIG. 2 is a top view of an embodiment of the illuminatable windshield assembly (100) depicting channels (6) having been formed therein.

Turning to FIG. 2, an embodiment of windshield assembly 100 is shown, wherein assembly (100) comprises a windshield (5), at least one upper retaining clips (3), at least one lower retaining clips (4), and at least one channel (6) formed therein windshield (5) defining an interior edge (20) in both driver's side rear surface (17) and peripheral surface (16) of windshield (5). As indicated supra, assembly 100 further comprises ornamental designs (13) which can be of any number, type, design, or location; therefore, altering the number, location, or orientation of the channels (6) may be necessary to achieve the desired illumination effect on the ornamental design (13). While FIG. 2 depicts at least two channels (6), any desired number may be used. The channels (6) may be through the either the front surface (15) or the driver's side rear surface (17). The channels (6) can be cut through the rear surface (17) to a specific depth, width, and length as desired for a specific visual effect, light intensity or need of light source. It should be noted assembly 100 may be secured to a vehicle by other known methods such as by friction fit, adhesive or mounts (clips 3 and 4) as described above. Channels (6) enclose at least a portion of a waveguide (12) (described below) which is further connected to light source (10) (also described below) configured to emit light into channel (6), thereby illuminating at least part of the peripheral surface (16) of the windshield assembly.

Figure 3:
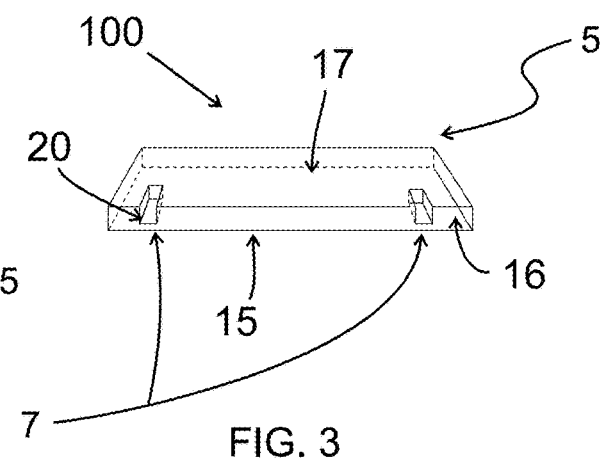
FIG. 3 is a top perspective view of an embodiment of illuminatable windshield assembly (100) wherein channels (7) are cut through the driver's side rear surface (17) of the windshield (5) and terminate therein.
Figure 11:
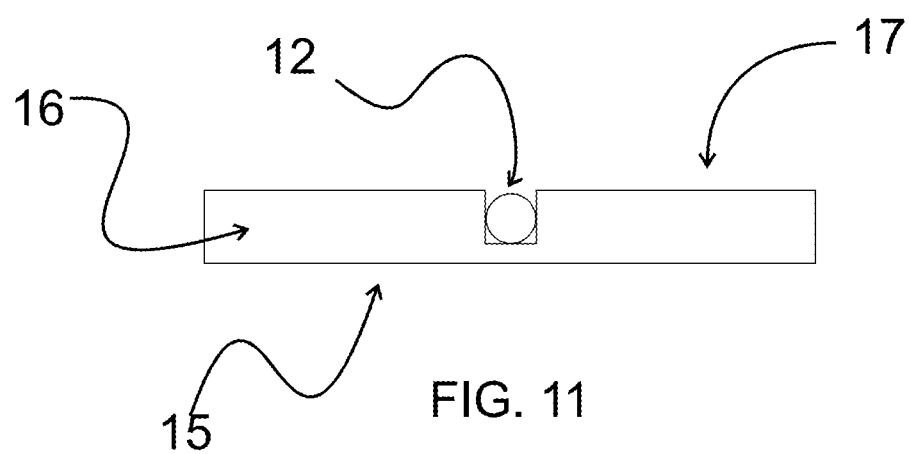
FIG. 11 is a cross sectional view taken along the dotted line 18-18 in FIG. 7 illustrating the fiber optic cable (12) seated within the channel (7).

Turning to FIG. 3 a top perspective view of an embodiment of windshield assembly 100 is shown wherein channels (7) are cut through the driver's side rear surface (17) of the windshield (5) and terminate therein is shown. The channels (6) could be made to virtually any size and depth; however, the ideal embodiment contemplates channels that are rectangular and slightly narrower in width than the diameter of the optical waveguide (12), but of a slightly greater depth than the diameter of the optical waveguide (12) so as to create a secure fit when an optical waveguide (12) is seated within the channel (7) as depicted in FIG. 11. The length of the channel (7) should be of sufficient length to ensure the optical waveguide (12) can be securely fastened within windshield (5) when fully inserted into channel (7). Generally, a length of 0.5" to 1" for channel (7) has been found to be a sufficient length.

Figure 4:
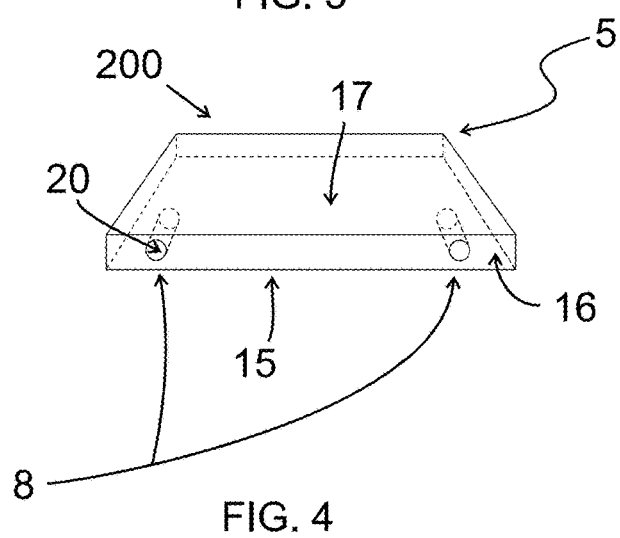
FIG. 4 is an alternate embodiment of illuminatable windshield assembly (200) wherein holes are drilled in the peripheral side (16) of the windshield (5) and run parallel with the driver's side rear surface (17).

Turning to FIG. 4, an alternate embodiment of windshield assembly (200) is shown which comprises at least one channel (8) being cylindrical in shape and formed therein peripheral edge (16) of windshield (5) and defining an interior edge (20), terminating at a predetermined distance from the peripheral surface (16) and aligned such that the channels (8) do not break through either the front surface (15) or driver's side rear surface (17). Ideally, the diameter of channel (8) should be the minimum necessary to allow for the proper securement of the optical waveguide (12). The length of the channel (8) should be of sufficient length to ensure the optical waveguide (12) can be securely fastened within windshield (5) when fully inserted into channel (8). Generally, a length between 0.5" and 1" for channels (8) is sufficient. Once fully inserted into channel (7) or channel (8) or within channel (9) (see below), optical waveguide (12) can be securely fastened into said channel using an appropriate adhesive (i.e., silicone, hot glue) or mechanical means (i.e., crimping, the use of clips). It is also contemplated channels (7), (8), (9) and optical waveguide (12) can be hidden with a sticker or other decorative decal to conceal the assembly if desired.

Turning to FIGS. 5 and 6, an alternate embodiment of windshield assembly (300) is shown, where assembly (300) comprises a windshield (5) with at least one channel (9) extending the entire horizontal length of windshield (5). Ideally, the dimensions of channel (9) would be that of, or slightly larger than, the profile dimensions of the optic waveguide. Channel (9) can be formed in the front surface (15), the driver's side rear surface (17), or in peripheral surface (16). FIG. 11 depicts a channel formed in either the front surface (15) or the driver's side rear surface (17). If formed through the peripheral surface (16), channel (9) should be aligned so that it does not break through either the front peripheral surface (15) or driver's side rear surface (17). FIG. 9 depicts channel (9) with optical waveguide (12) seated therein with both ends extending out of the periphery of windshield (5); optical waveguide (12) can be cut to virtually any desired length. Although not depicted, each end of the optical waveguide (12) could then be coupled to a light source. Channel (9) may be any desired shape which allows waveguide (12) to secure within channel (9), including but not limited to rectangular, cylindrical or triangular.

Turning to FIG. 7, a top view of an embodiment of windshield assembly (100) shown where assembly further comprises at least one optical waveguide (12) and at least one light source (10). One end of optical waveguide (12) is fully seated within at least one channel (7) while the opposite end of the optical waveguide (12) is coupled to at least one light source (10). It is contemplated more than one optical waveguide (12) may attach to the same light source (10) or each waveguide (12) may connect to a different light source (10). Light source (10) further comprises at least two electrical leads (11) which allow a power source, such as a vehicle battery to power the at least one light source (10).

FIG. 8 illustrates another embodiment of assembly 100 similar to that depicted in FIG. 7, with the exception that FIG. 8 depicts two distinct light sources (10). It is contemplated light source (10) may be any variation of light sources are readily commercially available (also commonly referred to as "light drivers" or "light engines"). The light sources can be purchased in various voltages, wattage, colors, and also for coupling to different diameters, types, or number of optical waveguides. Most commercially available light sources, especially RGB lights (those that can change color) generally have remote controls so the user can turn the unit on/off, or change the brightness thereof. In the event that the light source cannot be inherently remotely controlled, it is contemplated that a switch would be employed between the electrical leads (11) and electric power supply for the purpose of allowing the user to manually turn off the light source (10). While FIG. 7 and FIG. 8 depict only two optical waveguides (12) with either one or two light sources (10), respectively, any number of optical waveguides (12) and light sources (10) can be employed so that each light source (10) is coupled to at least one optical light guide (12).

While the present invention has been described above in terms of specific embodiments, it is to be understood that the invention is not limited to these disclosed embodiments. Many modifications and other embodiments of the invention will come to mind of those skilled in the art to which this invention pertain, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. An improved illuminatable windshield assembly comprising:
   a single-pane windshield having a front surface, a rear surface, a frameless peripheral surface defining a thickness, and at least one channel formed within at least the peripheral surface further comprising an interior edge;
   at least one light source located externally to, and situated remotely from, the windshield; and
   at least one optical waveguide of which at least one end is connected to the light source and at least a portion of the other end of the waveguide is enclosed internally within the at least one channel and arranged to emit light into the interior edge, thereby illuminating at least a part of the peripheral surface of the windshield assembly.

2. The windshield assembly of claim 1 wherein the channel is a through channel.

3. The windshield assembly of claim 1 wherein the channel terminates within the windshield.

4. The windshield assembly of claim 1 wherein the windshield has a plurality of channels formed therein, and said light source is a single light source coupled to a corresponding number of optical waveguides seated within said channels.

5. The windshield assembly of claim 1 wherein the windshield has a plurality of channels formed therein, and said light source is a plurality of light sources each coupled to a corresponding number of optical waveguides seated within said channels.

6. The windshield assembly of claim 1 wherein the at least one light source emits light of a desired color.

7. The windshield assembly of claim 1 wherein the at least one light source emits light of multiple colors.

8. An improved illuminatable windshield assembly comprising:
   a single-pane windshield having a front surface, a rear surface, a frameless peripheral surface defining a thickness, and at least one channel formed within at least the peripheral surface further comprising an interior edge;
   at least one light source located externally to, and situated remotely from, the windshield;
   at least one optical waveguide of which at least one end is connected to the light source and at least a portion of the other end of the waveguide is enclosed internally within the at least one channel and arranged to emit light into the interior edge, thereby illuminating at least a part of the peripheral surface of the windshield assembly; and
   a source of electrical power for said at least one light source.

9. The windshield assembly of claim 8 wherein the power for the at least one light source is derived from a vehicle's electrical system.

10. The windshield assembly of claim 8 wherein said source of electrical power is a battery.

11. The windshield assembly of claim 10 wherein said battery is a battery for a vehicle.

12. An improved illuminatable windshield assembly comprising:
- a single-pane windshield having a front surface, a rear surface, a frameless peripheral surface defining a thickness, and at least one channel formed within at least the peripheral surface further comprising an interior edge;
- at least one light source located externally to, and situated remotely from, the windshield; and
- at least one optical waveguide of which at least one end is connected to the light source and at least a portion of the other end of the waveguide is seated within the at least one channel formed in the windshield cut through the rear surface thereof and arranged to emit light into the interior edge, thereby illuminating at least a part of the peripheral surface of the windshield assembly.

13. The windshield assembly of claim 12 wherein said at least one channel is slightly narrower than the diameter of the optical waveguide.

14. The windshield assembly of claim 12 wherein said at least one channel is rectangular in shape.

* * * * *